(12) United States Patent
Newhouse et al.

(10) Patent No.: US 9,103,500 B2
(45) Date of Patent: Aug. 11, 2015

(54) PRESSURE VESSEL BOSS AND LINER INTERFACE

(75) Inventors: Norman L. Newhouse, Lincoln, NE (US); Dale B. Tiller, Lincoln, NE (US)

(73) Assignee: Hexagon Technology AS, Alesund (NO)

( * ) Notice: Subject to any disclaimer, the term of this patent is extended or adjusted under 35 U.S.C. 154(b) by 971 days.

(21) Appl. No.: 13/143,250

(22) PCT Filed: Jan. 8, 2010

(86) PCT No.: PCT/US2010/020425
§ 371 (c)(1),
(2), (4) Date: Aug. 30, 2011

(87) PCT Pub. No.: WO2010/080948
PCT Pub. Date: Jul. 15, 2010

(65) Prior Publication Data
US 2011/0303681 A1    Dec. 15, 2011

Related U.S. Application Data

(60) Provisional application No. 61/143,516, filed on Jan. 9, 2009.

(51) Int. Cl.
*B65D 6/40* (2006.01)
*F17C 1/16* (2006.01)
*F17C 1/06* (2006.01)

(52) U.S. Cl.
CPC ... *F17C 1/16* (2013.01); *F17C 1/06* (2013.01); *F17C 2201/0109* (2013.01);
(Continued)

(58) Field of Classification Search
CPC ...... F17C 1/16; F17C 1/06; F17C 2223/0123; F17C 2203/0604; F17C 2221/035; F17C 2203/0619; F17C 2260/011; F17C 2221/014; F17C 2260/036; F17C 2221/011; F17C 2203/066; F17C 2203/0673; F17C 2223/036; Y10T 29/49826

USPC ......... 220/582, 586, 592, 581, 415, 589, 657, 220/601, 414, 465, 661
See application file for complete search history.

(56) References Cited

U.S. PATENT DOCUMENTS

| 4,589,563 A | 5/1986 | Born |
| 5,429,845 A | 7/1995 | Newhouse et al. |

(Continued)

FOREIGN PATENT DOCUMENTS

| EP | 0550951 A1 | 7/1993 |
| JP | H06137433 A | 5/1994 |

(Continued)

OTHER PUBLICATIONS

Rejection Decision from the State Intellectual Property Office of People's Republic of China dated Feb. 12, 2014, in corresponding Chinese Patent Application No. 201080004144.4 (17pages).
(Continued)

*Primary Examiner* — Robert J Hicks
*Assistant Examiner* — Kareen Rush
(74) *Attorney, Agent, or Firm* — James L. Young; Westman Champlin & Koehler, P.A.

(57) ABSTRACT

A boss for a pressure vessel has a flange. The flange includes an interior keyway having an inner sidewall and a plurality of bores disposed on the inner sidewall. A pressure vessel includes a main body section and an end section. The end section includes a boss and the boss includes a flange. The flange includes an interior keyway having an inner sidewall and a plurality of bores disposed on the inner sidewall. In another aspect, a pressure vessel includes an outer shell, and inner liner and a boss including a flange with an exterior side and an interior side. The liner is mechanically integrated with the flange via a plurality of anchors, each anchor contacting the flange only on the interior side. A method of forming a pressure vessel includes providing a boss having a flange. The flange has an interior keyway having an inner sidewall and a plurality of bores disposed on the inner sidewall. The method comprises allowing a fluid polymer material to flow into the interior keyway and into the plurality of bores.

13 Claims, 7 Drawing Sheets

(52) U.S. Cl.
CPC .. *F17C 2201/056* (2013.01); *F17C 2203/0604* (2013.01); *F17C 2203/066* (2013.01); *F17C 2203/0619* (2013.01); *F17C 2203/0663* (2013.01); *F17C 2203/0673* (2013.01); *F17C 2205/0305* (2013.01); *F17C 2221/011* (2013.01); *F17C 2221/014* (2013.01); *F17C 2221/033* (2013.01); *F17C 2221/035* (2013.01); *F17C 2223/0123* (2013.01); *F17C 2223/036* (2013.01); *F17C 2260/011* (2013.01); *F17C 2260/036* (2013.01); *Y10T 29/49826* (2015.01)

(56) References Cited

U.S. PATENT DOCUMENTS

| | | | |
|---|---|---|---|
| 5,476,189 | A | 12/1995 | Duvall |
| 5,518,141 | A | 5/1996 | Newhouse et al. |
| 5,839,600 | A * | 11/1998 | Moreira et al. ........... 220/560.04 |
| 5,938,209 | A * | 8/1999 | Sirosh et al. ................... 277/622 |
| 5,979,692 | A | 11/1999 | West |
| 6,135,308 | A | 10/2000 | Fang |
| 6,227,402 | B1 | 5/2001 | Shimojima et al. |
| 6,793,095 | B1 | 9/2004 | Dulisse et al. |
| 7,549,555 | B2 * | 6/2009 | Suzuki et al. ................. 220/581 |
| 7,648,042 | B2 | 1/2010 | Lee et al. |
| 7,861,887 | B2 * | 1/2011 | Ota et al. ...................... 220/581 |
| 2007/0164561 | A1 | 7/2007 | Kwon |
| 2008/0251520 | A1 | 10/2008 | Ota et al. |

FOREIGN PATENT DOCUMENTS

| | | |
|---|---|---|
| JP | H10332083 A | 12/1998 |
| JP | H11044399 A | 2/1999 |
| JP | 2000291888 A | 10/2000 |
| JP | 2007528473 A | 10/2007 |
| RU | 2188356 | 8/2002 |

OTHER PUBLICATIONS

Examiner's Report from the Canadian Intellectual Property Office dated Apr. 15, 2014, in corresponding Canadian Patent Application No. 2,749,311 (2 pages).
Second Official Letter from the European Patent Office dated Mar. 25, 2013, for corresponding European Patent Application No. 10700091.1 filed on Jan. 8, 2010 (2 pages).
Second Office Action from the Chinese Intellectual Property Office dated Apr. 24, 2013, for corresponding Chinese Patent Application No. 201080004144.4 filed on Jan. 8, 2010 (14 pages—with translation).
Decision of Patent Grant in corresponding Japanese Application No. 2011/545439, dated Jul. 1, 2014 (4 pages).
Written Opinion of the International Searching Authority from PCT Application No. PCT/US2050/020425, 5 pages (Feb. 15, 2010).
Japanese Office Action dated Oct. 15, 2013 for corresponding Japanese Patent Application No. 2011-545439, filed Jan. 8, 2010, 4 pages.
First Office Action, European Patent Office, dated May 2, 2012, from European Patent Application n°10700091.1 (2 pages).
Third Office Action from the Chinese Intellectual Property Office dated Sep. 12, 2013, for corresponding Chinese Patent Application No. 201080004144.4 filed on Jan. 8, 2010 (15 pages with translation).
Reply to European Patent Office communication regarding European Patent Application No. 10700091.1, dated Sep. 3, 2012 (7 pages).
First Office Action, State Intellectual Property Office of People's Republic of China, dated Sep. 27, 2012, from Chinese Patent Application No. 20108000414.4 (17 pages).
Official Action issued by the Patent Office of the Russian Federation on Aug. 21, 2013, in corresponding Russian Patent Application No. 2011133220/06(049002).
International Search Report from corresponding PCT Application No. PCT/US2050/020425, 2 pages (Feb. 15, 2010).
Russian Decision on Grant dated Nov. 8, 2013, for corresponding Russian Application No. 2011133220, filed Aug. 8, 2011 (11 pages).

\* cited by examiner

PRESSURE VESSEL BOSS AND LINER INTERFACE

BACKGROUND

Pressure vessels are commonly used for containing a variety of fluids under pressure, such as storing oxygen, natural gas, nitrogen, propane and other fuels, for example. Suitable container materials include laminated layers of wound fiberglass filaments or other synthetic filaments bonded together by a thermal-setting or thermoplastic resin. An elastomeric or other non-metal resilient liner or bladder often is disposed within the composite shell to seal the vessel and prevent internal fluids from contacting the composite material. The composite construction of the vessels provides numerous advantages such as lightness in weight and resistance to corrosion, fatigue and catastrophic failure. These attributes are due to the high specific strengths of the reinforcing fibers or filaments that are typically oriented in the direction of the principal forces in the construction of the pressure vessels.

FIGS. 1 and 2 illustrate an elongated pressure vessel 10, such as that disclosed in U.S. Pat. No. 5,476,189, which is hereby incorporated by reference. Vessel 10 has a main body section 12 with end sections 14. A boss 16 is provided at one or both ends of the vessel 10 to provide a port for communicating with the interior of the vessel 10. The vessel 10 is formed from an inner polymer liner 20 covered by an outer composite shell 18. In this case, "composite" means a fiber reinforced resin matrix material, such as a filament wound or laminated structure.

The liner 20 has a generally hemispheroidal end section 22 with an opening 24 aligned within an opening 26 in the outer composite shell 18. Boss 16 is positioned within the aligned openings and includes a neck portion 28 and a radially outwardly projecting flange portion 30. The boss 16 defines a port 32 through which fluid at high pressure may be communicated with the interior of the pressure vessel 10.

Liner 20 includes a dual layer lip circumscribing opening 24 in the liner 20, with an outer lip segment 34 and an inner lip segment 36 defining an annular recess 38 therebetween for receiving flange portion 30 of boss 16. Dovetailed inter-engaging locking means 40 are provided between flange portion 30 and outer and inner lip segments 34 and 36, respectively, to lock liner 20 to boss 16.

This type of interlocking liner and boss structure has proved effective in certain applications, such as for compressed natural gas (CNG) fuel containers. However, in high pressure (e.g., 700 bar) service, distortions of the plastic liner material adjacent the boss has been noted, leading to some tendency of the plastic to be pulled out of the keyway (i.e., out of the interlocking means 40). The "distortion" of this area in high pressure applications comes from the presence of high pressure gas in the keyway between the liner 20 and boss 16. High pressure gas saturates the liner material and then outgases when the pressure drops. Thus, the gas permeating the area between the liner 20 and boss 16 can then have a higher pressure than the gas within vessel 10, such as, for example, when gas is being vented from the vessel 10. As a result, the excess pressure between the liner 20 and boss 16 can cause the liner material to be forced out of the keyway. Thus, there remains a need for a liner and boss interface structure that prevents separation of the liner and boss under high pressure and that allows venting of any such gas trapped in the keyway between the liner and the boss.

SUMMARY

In one aspect, the disclosure describes a boss for a pressure vessel, the boss having a flange. The flange comprises an interior keyway having an inner sidewall and a plurality of bores disposed on the inner sidewall.

In another aspect, the disclosure describes a pressure vessel comprising a main body section and an end section connected to the main body. The end section comprises a boss and the boss comprises a flange. The flange comprises an interior keyway having an inner sidewall and a plurality of bores disposed on the inner sidewall.

In yet another aspect, the disclosure describes a pressure vessel comprising a composite shell and a boss. The composite shell comprises an outer shell and an inner liner disposed within the outer shell. The boss defines a port in the composite shell and comprises a flange with an exterior side and an interior side. The liner is mechanically integrated with the flange via a plurality of anchors, each anchor contacting the flange only on the interior side thereof.

In yet another aspect, a method of forming a pressure vessel comprises providing a boss having a flange. The flange has an interior keyway having an inner sidewall and a plurality of bores disposed on the inner sidewall. The method comprises allowing a fluid polymer material to flow into the interior keyway and into the plurality of bores.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. Moreover, where terms such as above, below, over, under, top, bottom, side, right, left, etc., are used, it is to be understood that they are used only for ease of understanding the description. It is contemplated that structures may be otherwise oriented.

DETAILED DESCRIPTION

Figure 3:
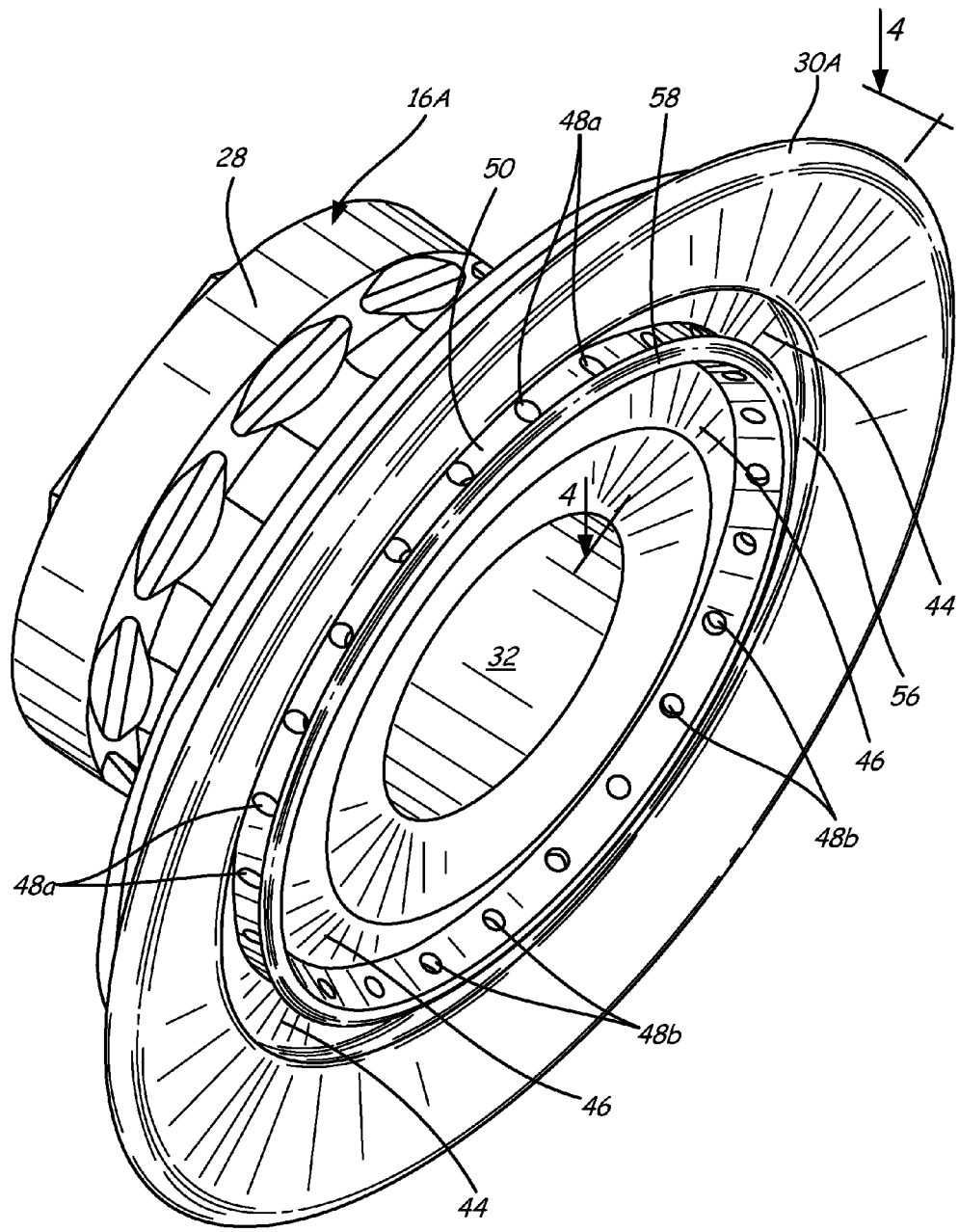
FIG. 3 is a perspective view of a first embodiment of a boss of the present disclosure.
Figure 4A:
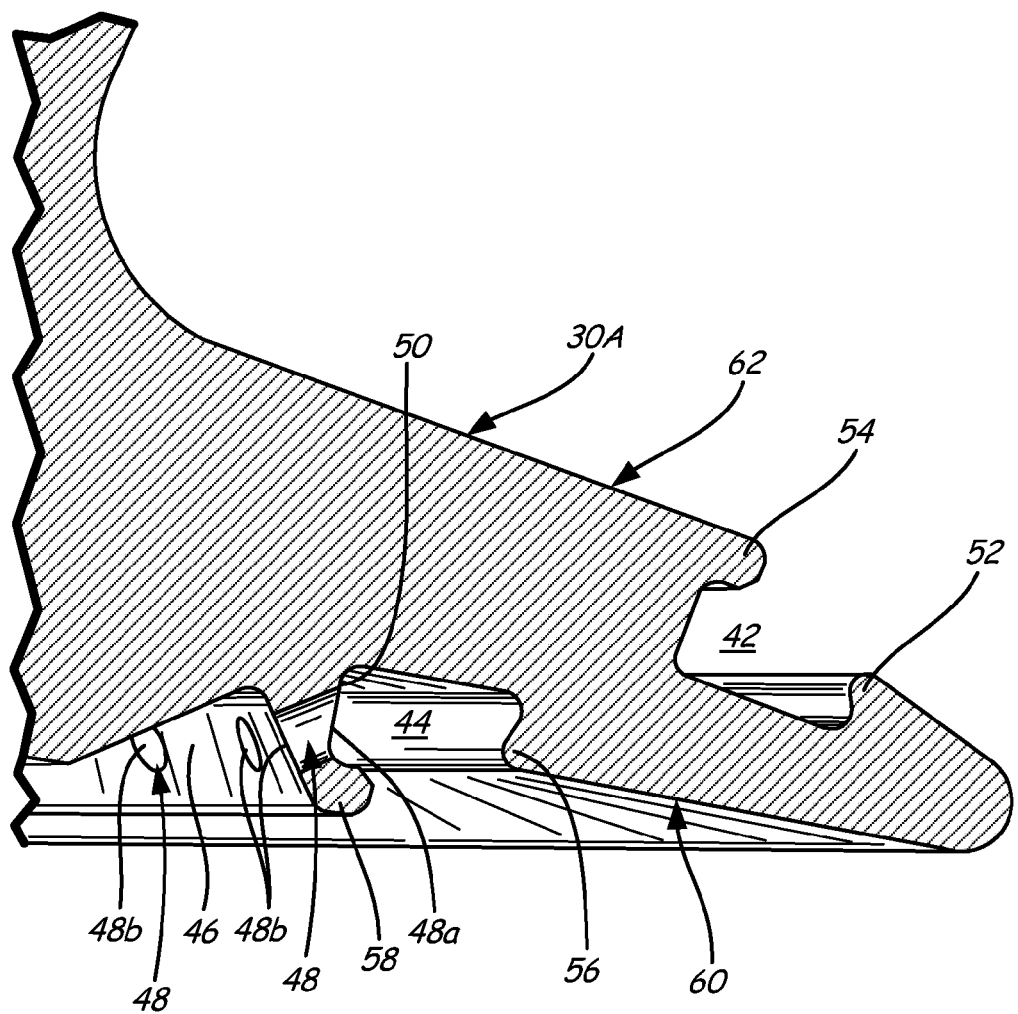
FIG. 4A is a partial cross-sectional view through the boss of FIG. 3, taken along line 44.
Figure 4B:
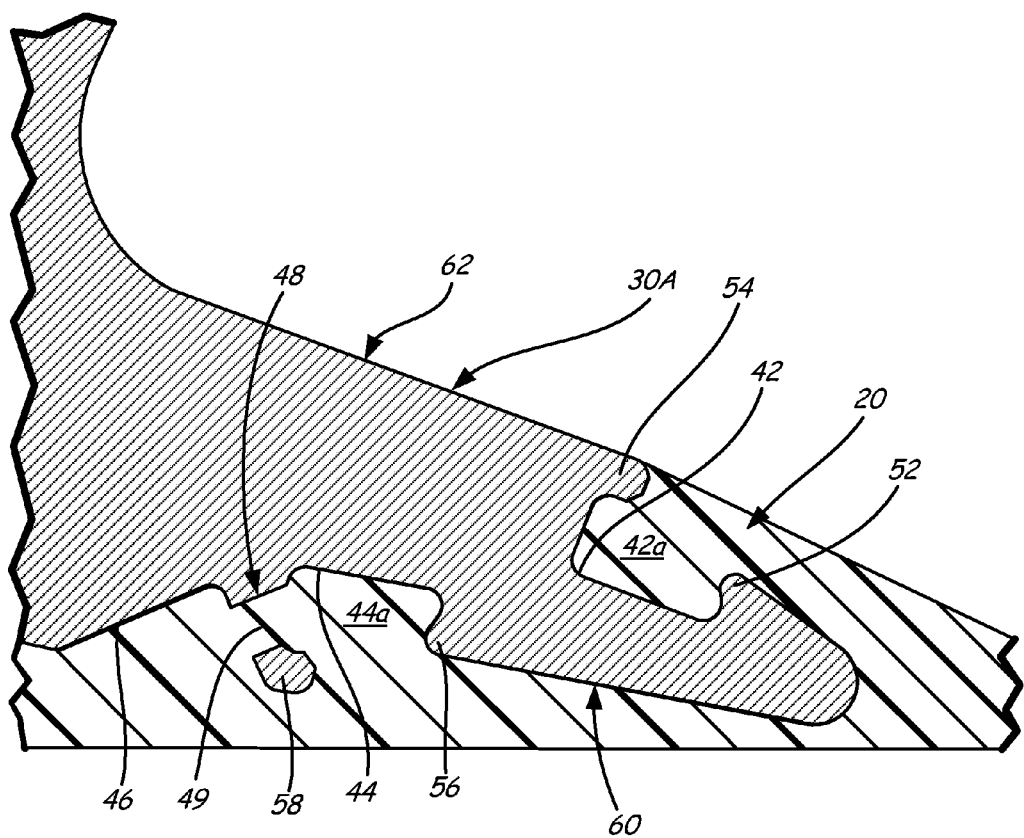
FIG. 4B is similar to FIG. 4A but shows the boss connected to a vessel liner.

In one embodiment, an improved boss and liner interface structure is illustrated on boss 16A of FIGS. 3, 4A and 4B. Annular external or exterior keyway 42 and annular internal or interior keyway 44 are provided on flange 30 to mate with interlocking keys 42a and 44a of liner 20, respectively. As used in this disclosure, the term "dovetail" describes a keyway or interlocking key configuration comprising a lip, notch, flare, projection or similar or corresponding structure so that a joint formed between the keyway 42/44 of boss 16A and interlocking keys 42a/44a of liner 20 is structurally inhibited from separation. External keyway 42 includes annular lip 52 extending in an axial direction to prevent separation in the radial direction and annular lip 54 extending in a radial direction to prevent separation in the axial direction. Similarly, internal keyway 44 includes annular lip 56 extending in an axial direction to prevent separation in the radial direction and annular lip 58 extending in a radial direction to prevent separation in the axial direction.

An annular groove 46 is defined on an interior side of flange 30A of boss 16A, radially inwardly of internal keyway 44. Groove 46 is connected to internal keyway 44 by means of a plurality of discrete bores 48 formed between inner sidewall 50 of internal keyway 44 and groove 46, with each bore 48 having, at one end thereof, a first opening 48a in internal keyway 44 and, at a second end thereof, a second opening in groove 46. In cross-section, bores 48 may be circular or elongated, for example. In an exemplary embodiment, groove 46 is substantially "V"-shaped.

A method of forming a pressure vessel 10 includes allowing a fluid polymer material for liner 20 to flow into and fill the external keyway, 42, internal keyway 44, groove 46 and bores 48. The liner material then solidifies, thereby forming key 42a, key 44a and anchor 49. Liner 20 is mechanically interlocked with boss 16A by anchors 49 formed within bores 48, connecting the liner material in groove 46 with the liner material in internal keyway 44 (key 44a). Accordingly, even under extreme pressure conditions, separation of liner 20 from boss 16A is prevented. In effect, the liner material 20 would need to tear apart before separation of liner 20 and boss 16A could occur.

Figure 1:
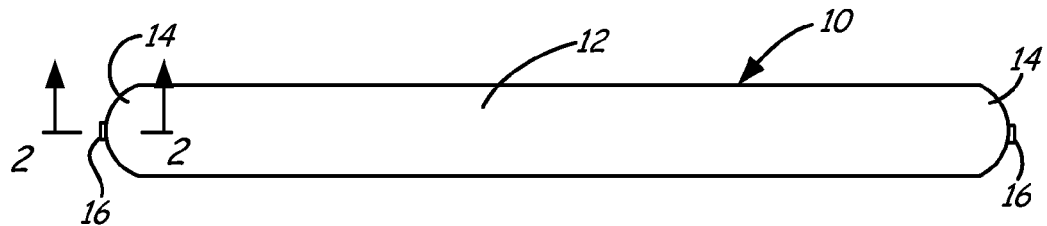
FIG. 1 is a side elevation view of a typical elongated pressure vessel.
Figure 2:
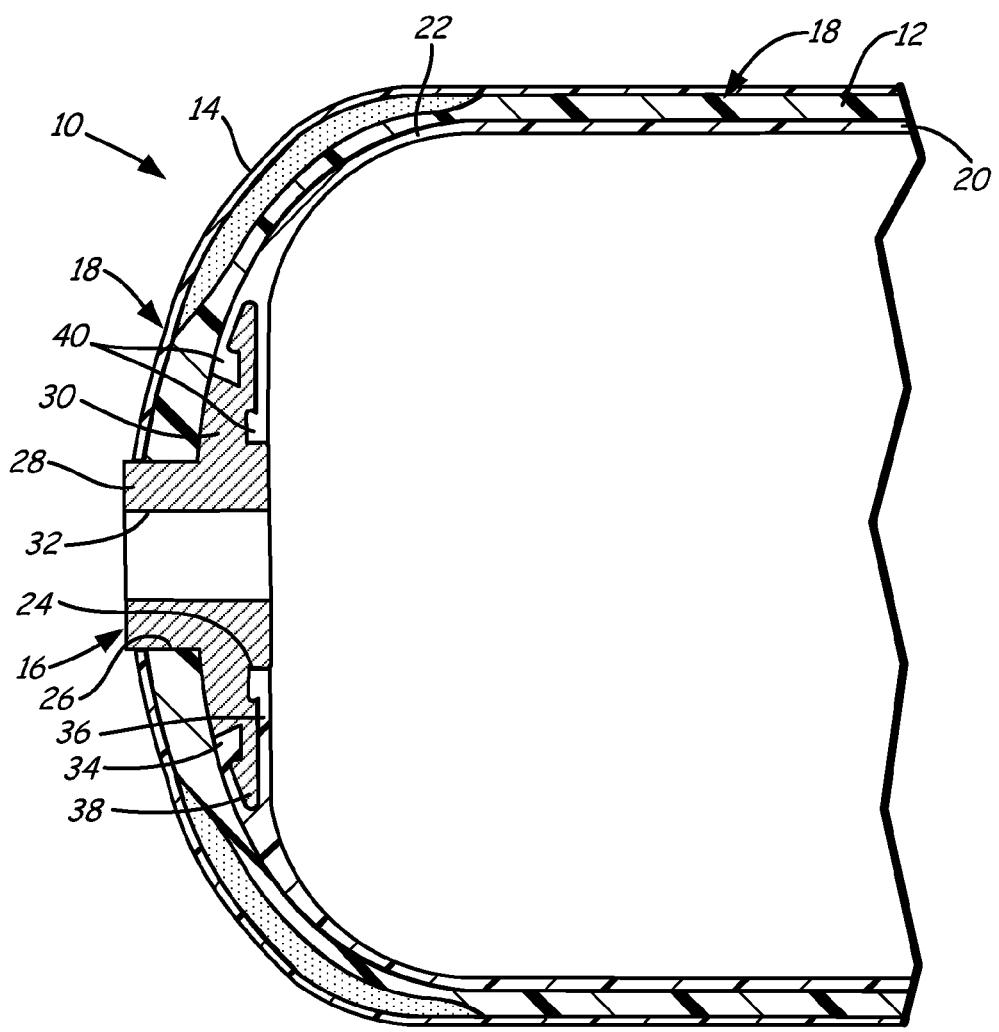
FIG. 2 is a partial cross-sectional view through one end of such a pressure vessel, taken along line 2-2 of FIG. 1.

Flange 30A has an interior side 60 and an exterior side 62. In an exemplary embodiment, each anchor 49 contacts only the interior side of the flange 30A, and does not contact the exterior side of the flange 30A. Because internal keyway 44, groove 46 and bores 48 are all located on the interior side 60 of flange 30A, there is no passage for gas leakage from the interior side of flange 30A to the exterior side of flange 30A. Moreover, any built-up gas between liner 20 and boss 16A can escape back into vessel 10 at opening 24 of liner 20 (see FIG. 2), thereby preventing a rupture or separation at the interface of liner 20 and boss 16A.

Figure 5:
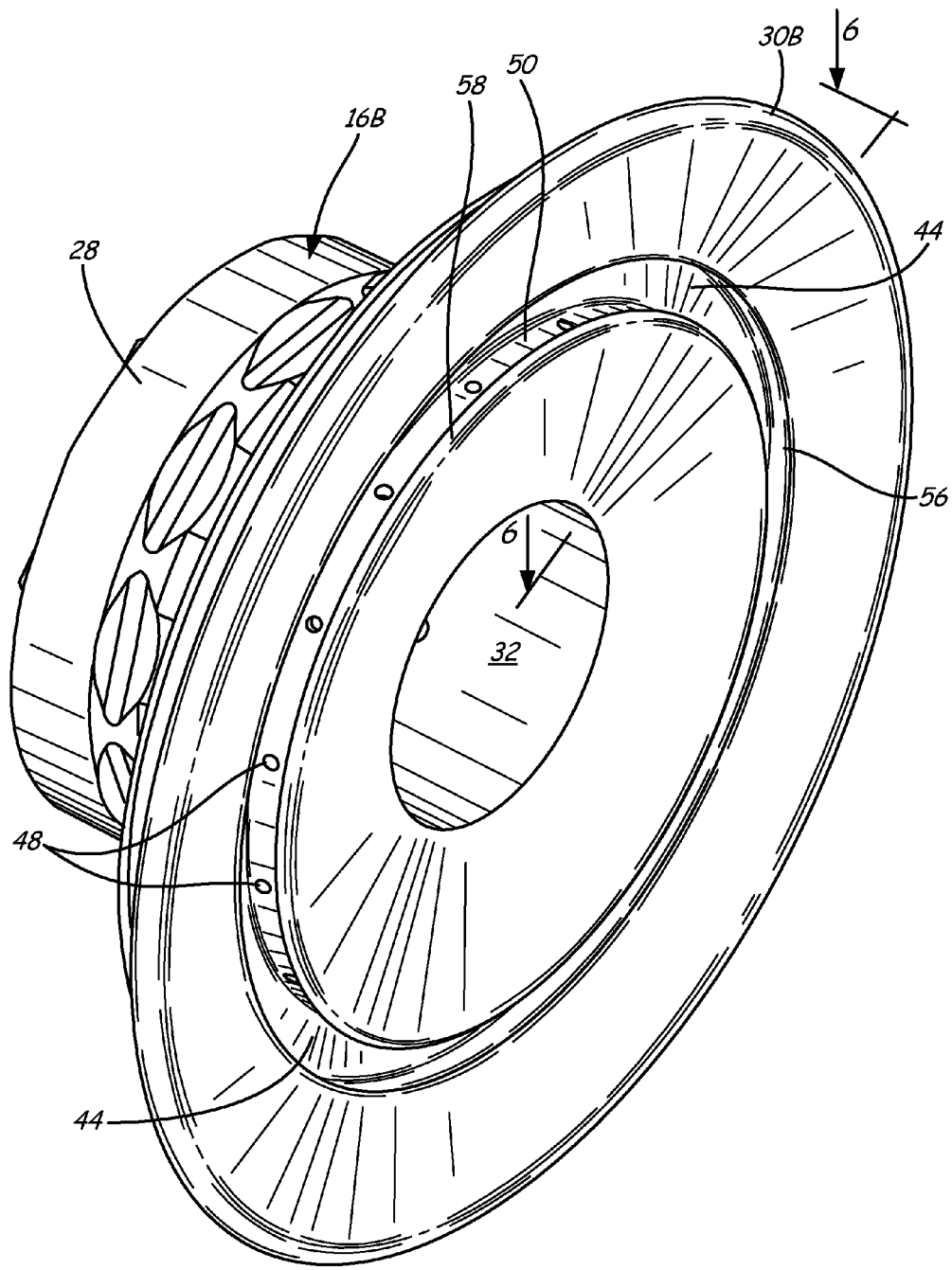
FIG. 5 is a perspective view of a second embodiment of a boss of the present disclosure.
Figure 6A:
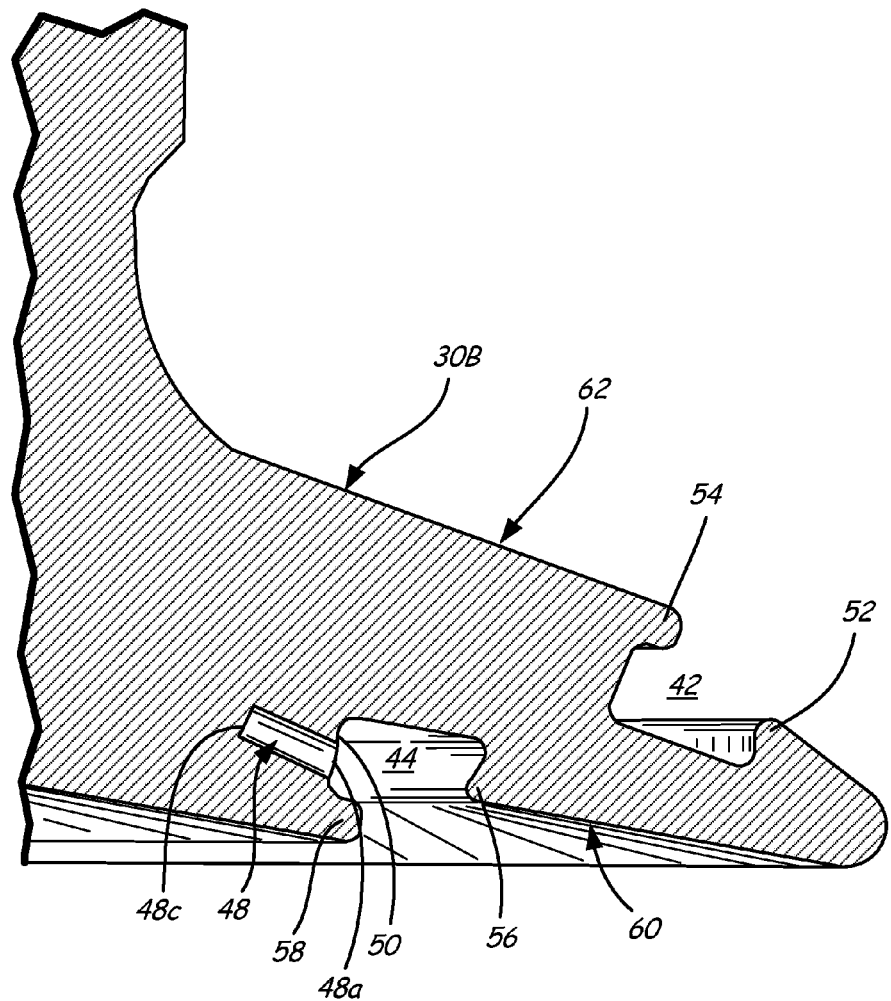
FIG. 6A is a partial cross-sectional view through the boss of FIG. 5, taken along line 6-6.
Figure 6B:
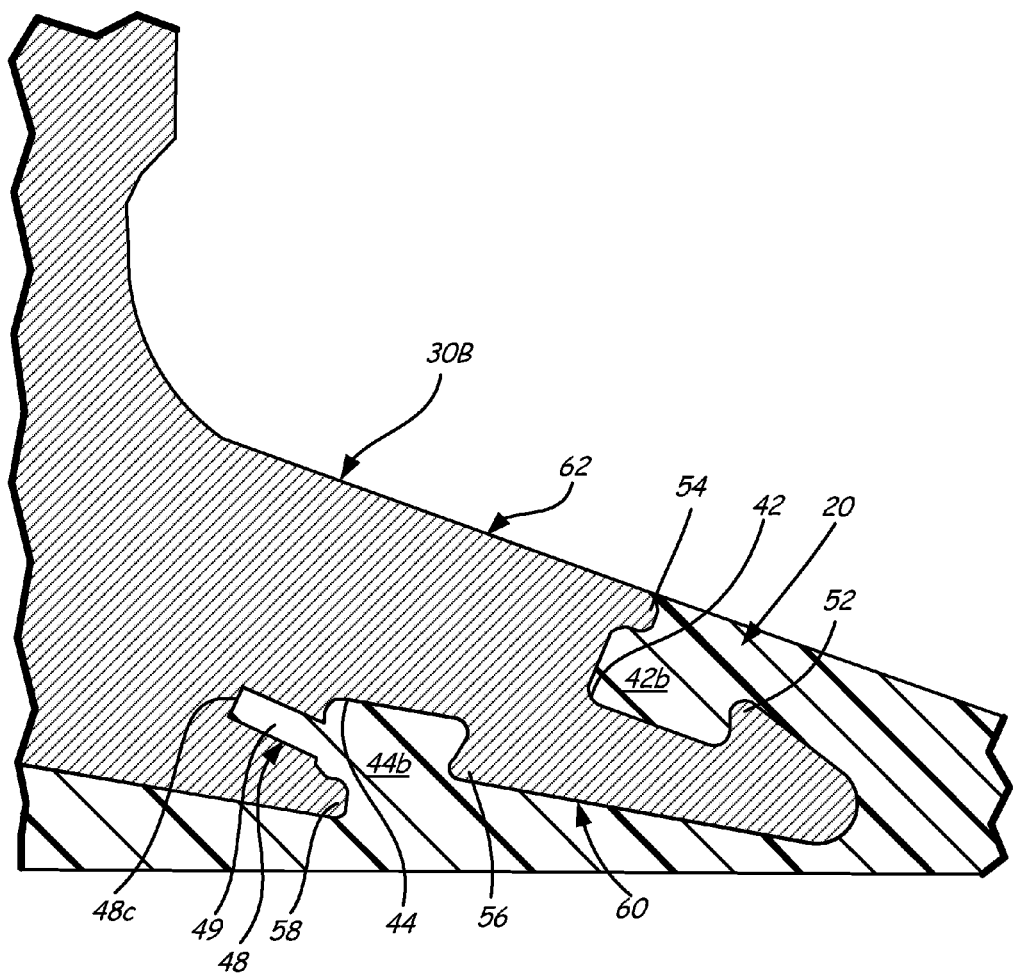
FIG. 6B is similar to FIG. 6A but shows the boss connected to a vessel liner.

Another exemplary boss of the present disclosure is illustrated in FIGS. 5, 6A and 6B. This exemplary boss 16B construction is similar to that of boss 16A, discussed above, except that no groove is provided radially inwardly of the inner keyway 44. Within that inner keyway 44, a plurality of discrete bores 48 are provided in the boss 16B in a near radial direction, via openings 48a in sidewall 50 of the keyway 44. As used herein, a "bore" need not extend all the way through a member. As such, the bore 48 may extend from its openings 48a to a closed end thereof, as at 48c in FIGS. 6A and 6B. As vessel 10 is formed, the material of liner 20 again forms annular keys that flow into and interlock with annular keyways 42 and 44 (external key 42b and internal key 44b, respectively). From internal key 44b, liner material fills bores 48 to form anchors 49 for preventing the separation of boss 16B and liner 20.

Each of the boss constructions discussed above (the boss 16A illustrated in FIGS. 3, 4A and 4B and the boss 16B illustrated in FIGS. 5, 6A and 6B) is intended to provide a highly stable and integrated interface between the boss 16A/B and liner 20, in order to prevent blowout and/or gas buildup between the boss 16A/B and liner 20.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa. For example, some bores may extend all the way through a portion of the flange (such as shown, for example, in FIGS. 3, 4A and 4B) while others do not (such as shown, for example, in FIGS. 5, 6A and 6B). Bore configurations may alternate radially around the flange (all-the-way-through bore, closed-end bore, all-the-way-through bore, etc.) or may be arranged in any other intermingled bore configuration arrangement about the flange.

What is claimed is:

1. A boss for a pressure vessel, the boss having a flange having an exterior side and an interior side, the boss comprising:
    an interior keyway disposed in the interior side and having an inner sidewall; and
    a plurality of bores disposed on the inner sidewall in communication with the interior keyway, wherein the bores do not communicate with the exterior side.

2. A boss for a pressure vessel, the boss having a flange having an exterior side and an interior side, the boss comprising:
    an interior keyway disposed in the interior side, and having an inner sidewall;
    a plurality of bores disposed on the inner sidewall, wherein the bores do not communicate with the exterior side; and
    a groove on the interior side disposed radially inward of the interior keyway, the plurality of bores connecting the interior keyway and the groove.

3. The boss of claim 2 wherein the groove is "V"-shaped.

4. The boss of claim 1 wherein the interior keyway comprises a lip extending in an axial direction of the boss.

5. The boss of claim 1 wherein the interior keyway comprises a lip extending in a radial direction of the boss.

6. The boss of claim 1 further comprising an exterior keyway disposed on the exterior side.

7. The boss of claim 6 wherein the exterior keyway comprises a lip extending in an axial direction of the boss.

8. The boss of claim 6 wherein the exterior keyway comprises a lip extending in a radial direction of the boss.

9. The boss of claim 1 wherein each bore has a first opening for that bore extending into the flange of the boss.

10. The boss of claim 1 wherein at least one bore extends through a portion of the flange to a second opening for that bore on a surface on the interior side of the flange.

11. A boss for a pressure vessel, the boss having a flange having an exterior side and an interior side, the boss comprising:

an interior keyway disposed in the interior side and having an inner sidewall; and a plurality of bores disposed on the inner sidewall, wherein the bores do not communicate with the exterior side, wherein at least one bore extends through a portion of the flange to a second opening for that bore on the interior side of the flange, wherein each second opening is disposed in an annular groove on the interior side of the flange.

12. The boss of claim 10 wherein each bore extends through the portion of the flange to the second opening for that bore on an interior side of the flange.

13. The boss of claim 9 wherein at least one bore extends into a portion of the flange to a closed end of the bore within the flange.

\* \* \* \* \*